Jan. 5, 1932.   H. W. BAUM   1,839,368
TRANSMISSION MECHANISM FOR HOISTING APPARATUS
Original Filed Feb. 13, 1928    2 Sheets-Sheet 1
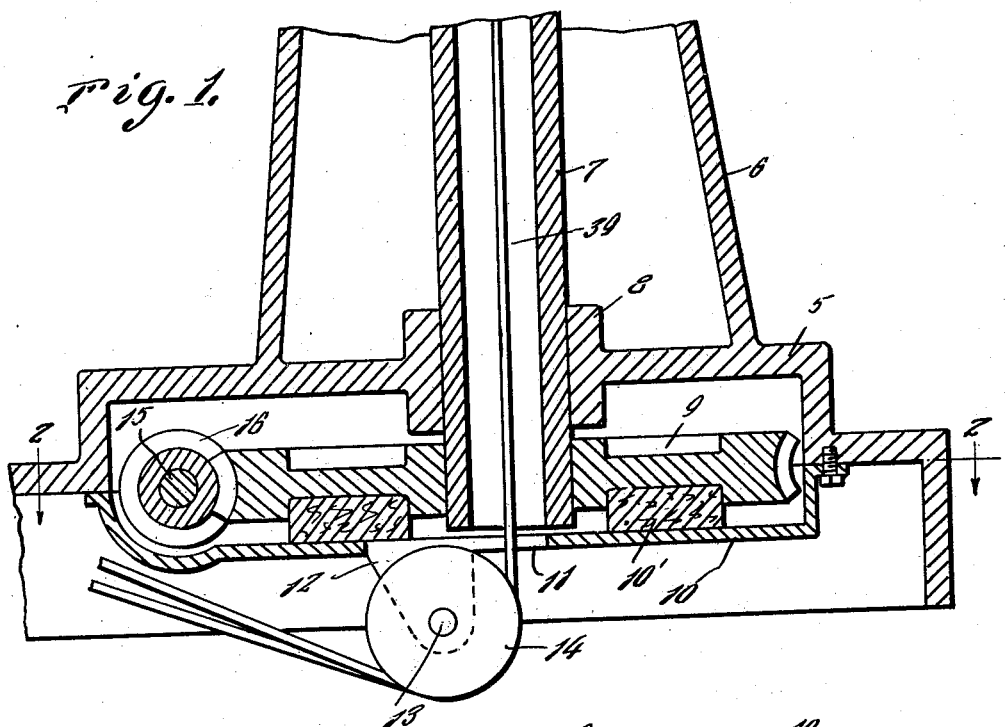
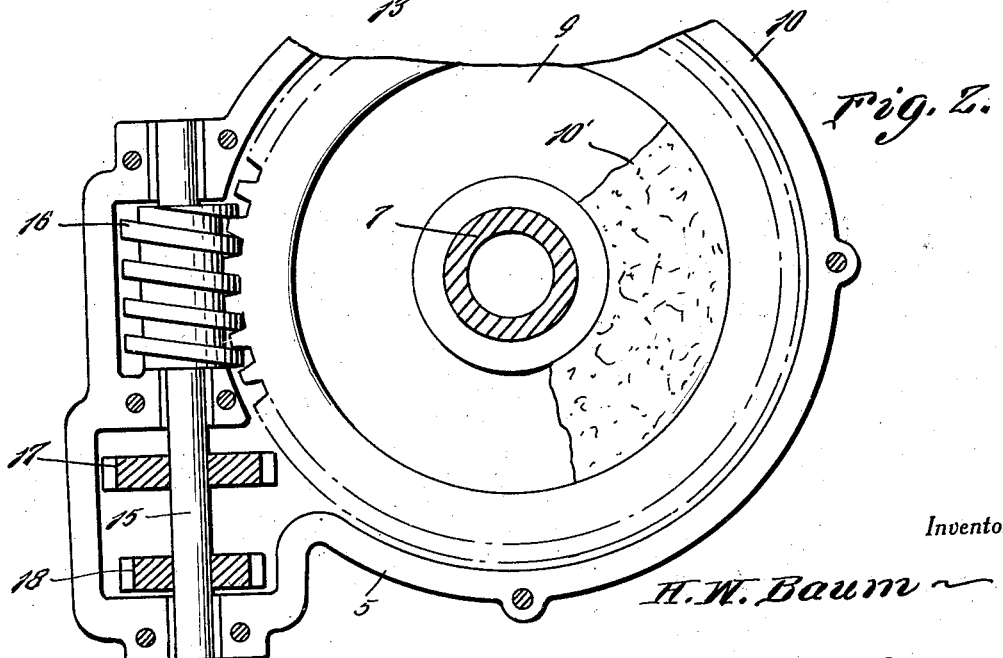
Inventor
H. W. Baum
By Clarence A. O'Brien, Attorney Jan. 5, 1932. H. W. BAUM 1,839,368
TRANSMISSION MECHANISM FOR HOISTING APPARATUS
Original Filed Feb. 13, 1928 2 Sheets-Sheet 2
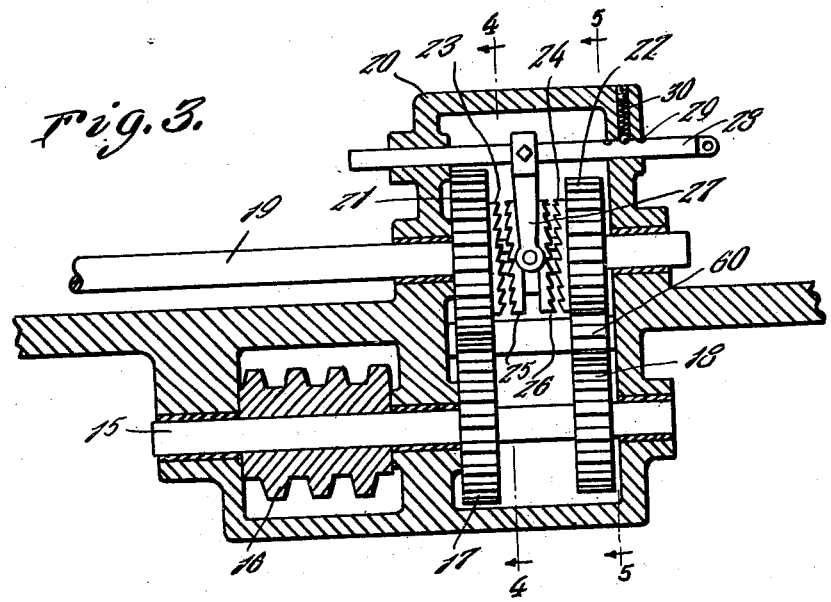
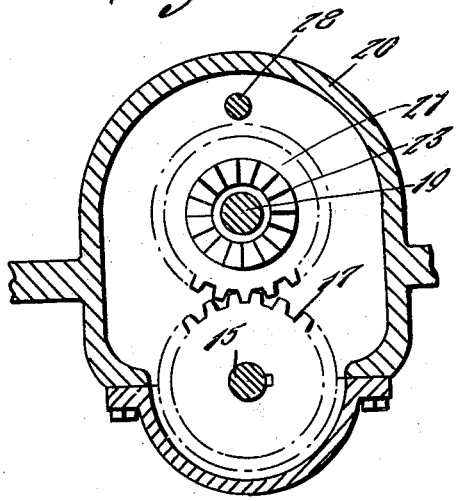
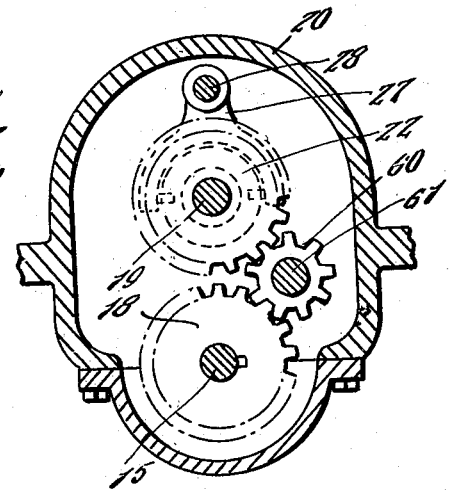
Inventor
H. W. Baum
By Clarence A. O'Brien
Attorney Patented Jan. 5, 1932

1,839,368

UNITED STATES PATENT OFFICE

HOWARD W. BAUM, OF KEARNY, NEW JERSEY

TRANSMISSION MECHANISM FOR HOISTING APPARATUS

Original application filed February 13, 1928, Serial No. 253,985. Divided and this application filed January 22, 1929. Serial No. 334,223.

The present invention appertains to improvements in transmission mechanism, and the subject matter of this application has been divided from my co-pending application, filed February 13, 1928, Serial No. 253,985, for a catch basin cleaner and hoisting apparatus.

The invention relates more specifically to a transmission mechanism adapted for use on hoisting apparatus, and has as its principal object the provision of a mechanism which will not only be practically foolproof in operation, but will be simple and efficient in use.

The present apparatus also possesses the qualities of being compact and durable.

After considering the following description and claim, it will be seen that other objects and advantages exist.

In the drawings:—

Figure 1 is a fragmentary vertical section through the lower portion of the pedestal and casting and base structure of the hoisting apparatus.

Fig. 2 is a fragmentary horizontal section taken substantially on the line 2—2 of Fig. 1.

Fig. 3 is a detail vertical section taken substantially through the transmission mechanism.

Fig. 4 is a vertical section taken substantially on the line 4—4 of Fig. 3.

Fig. 5 is a vertical section taken substantially on the line 5—5 of Fig. 3.

Referring to the drawings wherein like numerals designate like parts, the numeral 5 includes a base structure with a pedestal casting 9 rising therefrom. This represents a part of a hoist structure. The pedestal casting 6 is hollow and has extending therethrough a tubular mast 7 which is journaled in a bearing 8 provided in the base structure 5. A worm gear 6 is fixed to the lower end of the mast 7 and is housed in the base by means of a plate 10 which is provided with an opening 11, a portion of which registers with the interior of the mass 7.

An annular packing 10' is interposed between the wheel 9 and the cover plate 10 for preventing the escape of oil from within the base structure 5 through the opening 11. Brackets 12 depend from the edges of the openings 11 of the cover plate 10 and support a shaft 13 on which a pair of sheaves 14 are rotatably mounted. A shaft 15 is journaled in the base structure tangentially to the worm gear 9. A worm 16 is suitably fixed to the shaft 15 and meshes with the worm gear 9. The gears 17 and 18 are fixed for rotation with the shaft 15.

A drive gear 19 is journaled through a super-structure 20 rising from the base structure 5 and has fixed thereto gears 21 and 22 on the inner faces of which are series of clutch teeth 23 and 24 respectively. The gears 17 and 21 are in mesh and a pinion 16 on counter shaft 51 meshes with gears 22 and 18.

The series are arranged in an annular manner about the drive shaft 19. Clutch members 25 and 26 for meshing respectively with teeth 23 and 24 are formed in a unit splined on the shaft 19, the gears 21 and 22 being rotatable thereon. A fork 27 is used for shifting the unit either to a neutral position shown in Fig. 5 or so that the clutch segment 25 meshes with the clutch segment 23, or the clutch segment 26 meshes with the clutch segment 24.

This fork is operated by means of a bar 28 slidable through the super structure 20 and having notches 29 with which are engageable a spring pressed ball 30, for holding the fork in one of the three mentioned positions. The bar 28 is adjusted by suitable means connected to the apertured end of the bar, which may be manually or power operated.

Thus it will be seen that the mast may be turned in either direction through the intermediacy of the mechanism, with which it may be operated from any suitable prime mover, which is not of the essence of this invention, and therefore not shown.

Having thus described my invention, what I claim as new is:—

A structure comprising, in combination, a casing having an opening in its bottom, said casing adapted to contain a lubricant, a tubular, vertical mast having its lower end portion extending rotatably into the casing through the top thereof, a pulley wheel rotatably mounted on the casing beneath the bottom thereof and adjacent the opening, a cable trained over the pulley wheel and operable through the mast, a gear fixed on the mast in the casing having a concentric channel in its lower side, a resilient packing disposed in the channel and engaged with the casing bottom for preventing passage of the lubricant to the opening, and a gear engaged with the first named gear for driving same.

In testimony whereof I affix my signature.

HOWARD W. BAUM.